US007483982B2

(12) United States Patent
Hegli et al.

(10) Patent No.: US 7,483,982 B2
(45) Date of Patent: *Jan. 27, 2009

(54) FILTERING TECHNIQUES FOR MANAGING ACCESS TO INTERNET SITES OR OTHER SOFTWARE APPLICATIONS

(75) Inventors: Ronald Bjorn Hegli, San Diego, CA (US); Hal Case Lonas, Jr., Carlsbad, CA (US); Harold Kester, Cardiff, CA (US)

(73) Assignee: Websense, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/225,297

(22) Filed: Sep. 13, 2005

(65) Prior Publication Data

US 2006/0031504 A1 Feb. 9, 2006

Related U.S. Application Data

(63) Continuation of application No. 10/010,282, filed on Dec. 5, 2001, now Pat. No. 6,947,985.

(51) Int. Cl.
*G06F 15/173* (2006.01)
(52) U.S. Cl. .................. 709/225; 709/224; 709/229
(58) Field of Classification Search ......... 709/223–225, 709/229
See application file for complete search history.

(56) References Cited

U.S. PATENT DOCUMENTS 4,423,414 A 12/1983 Bryant et al.
4,941,084 A 7/1990 Terada et al.
5,493,692 A 2/1996 Theimer et al.

(Continued)

FOREIGN PATENT DOCUMENTS

EP 0 658 837 12/1994

(Continued)

OTHER PUBLICATIONS

European Search Report for Application No. 02258462.7, mailed Jan. 30, 2006.

(Continued)

*Primary Examiner*—Andrew Caldwell
*Assistant Examiner*—Michael D Meucci
(74) *Attorney, Agent, or Firm*—Knobbe Martens Olson & Bear LLP (57) ABSTRACT

A method and system for providing flexible access resources or services related to particular software applications are described. The system includes a database of Internet sites that have been categorized so that the system determines the category of information that a user is accessing on the Internet. The system is also programmed so users are only allowed to access sites a limited number of times. The system is further programmed to limit a user's access to the Internet based on the network's current bandwidth usage. Moreover, users can requested a postponed access, wherein the resource or service they are requesting is stored to a server, and available to the user at a later time. In addition, if a user chooses to access a resource or service that is within certain predefined categories, they are presented with the option of retrieving the resource or service, but notified that their access will be logged to a file.

29 Claims, 8 Drawing Sheets

U.S. PATENT DOCUMENTS

| | | | |
|---|---|---|---|
| 5,541,911 | A | 7/1996 | Nilakantan et al. |
| 5,548,729 | A | 8/1996 | Akiyoshi et al. |
| 5,555,376 | A | 9/1996 | Theimer et al. |
| 5,581,703 | A * | 12/1996 | Baugher et al. ............ 709/225 |
| 5,606,668 | A | 2/1997 | Shwed |
| 5,678,041 | A * | 10/1997 | Baker et al. ..................... 707/9 |
| 5,682,325 | A | 10/1997 | Lightfoot et al. |
| 5,696,486 | A | 12/1997 | Poliquin et al. |
| 5,696,898 | A | 12/1997 | Baker et al. |
| 5,706,507 | A * | 1/1998 | Schloss ................... 707/104.1 |
| 5,774,668 | A | 6/1998 | Choquier et al. |
| 5,787,253 | A | 7/1998 | McCreery et al. |
| 5,787,427 | A | 7/1998 | Benantar et al. |
| 5,799,002 | A | 8/1998 | Krishnan |
| 5,832,212 | A | 11/1998 | Cragun et al. |
| 5,832,228 | A | 11/1998 | Holden et al. |
| 5,832,503 | A | 11/1998 | Malik et al. |
| 5,835,722 | A | 11/1998 | Bradshaw et al. |
| 5,848,233 | A | 12/1998 | Radia et al. |
| 5,848,412 | A | 12/1998 | Rowland et al. |
| 5,850,523 | A | 12/1998 | Gretta, Jr. |
| 5,855,020 | A | 12/1998 | Kirsch |
| 5,884,325 | A | 3/1999 | Bauer et al. |
| 5,889,958 | A | 3/1999 | Willens |
| 5,892,905 | A | 4/1999 | Brandt et al. |
| 5,896,502 | A | 4/1999 | Shieh et al. |
| 5,899,995 | A | 5/1999 | Millier et al. |
| 5,911,043 | A | 6/1999 | Duffy et al. |
| 5,941,947 | A | 8/1999 | Brown et al. |
| 5,958,015 | A * | 9/1999 | Dascalu ..................... 709/229 |
| 5,961,591 | A | 10/1999 | Jones et al. |
| 5,978,807 | A | 11/1999 | Mano et al. |
| 5,983,279 | A | 11/1999 | Abraham et al. |
| 5,987,611 | A | 11/1999 | Freund |
| 5,991,807 | A | 11/1999 | Schmidt et al. |
| 5,996,011 | A | 11/1999 | Humes |
| 6,052,723 | A | 4/2000 | Ginn |
| 6,055,564 | A | 4/2000 | Phaal |
| 6,065,059 | A | 5/2000 | Shieh et al. |
| 6,085,241 | A * | 7/2000 | Otis ........................... 709/223 |
| 6,182,118 | B1 | 1/2001 | Finney et al. |
| 6,233,618 | B1 | 5/2001 | Shannon |
| 6,338,088 | B1 | 1/2002 | Waters et al. |
| 6,456,306 | B1 | 9/2002 | Chin et al. |
| 6,519,571 | B1 | 2/2003 | Guheen et al. |
| 6,606,659 | B1 | 8/2003 | Hegli et al. |
| 6,741,997 | B1 | 5/2004 | Liu et al. |
| 6,832,230 | B1 | 12/2004 | Zilliacus et al. |
| 6,894,991 | B2 * | 5/2005 | Ayyagari et al. ............ 370/325 |
| 6,947,935 | B1 | 9/2005 | Horvitz et al. |
| 6,947,985 | B2 | 9/2005 | Hegli et al. |
| 6,978,292 | B1 * | 12/2005 | Murakami et al. .......... 709/204 |
| 7,209,893 | B2 * | 4/2007 | Nii .............................. 705/26 |
| 7,213,069 | B2 * | 5/2007 | Anderson et al. ........... 709/225 |
| 2001/0032258 | A1 * | 10/2001 | Ishida et al. ................. 709/224 |
| 2001/0039582 | A1 * | 11/2001 | McKinnon et al. .......... 709/226 |
| 2002/0073089 | A1 | 6/2002 | Schwartz et al. |
| 2002/0129039 | A1 | 9/2002 | Majewski et al. |
| 2002/0133509 | A1 | 9/2002 | Johnston et al. |
| 2002/0152284 | A1 * | 10/2002 | Cambray et al. ............ 709/218 |
| 2003/0005112 | A1 * | 1/2003 | Krautkremer ............... 709/224 |
| 2003/0023860 | A1 | 1/2003 | Eatough et al. |
| 2003/0074567 | A1 | 4/2003 | Charbonneau |
| 2003/0126136 | A1 | 7/2003 | Omoigui |
| 2003/0126139 | A1 | 7/2003 | Lee et al. |
| 2003/0177187 | A1 | 9/2003 | Levine et al. |
| 2004/0019656 | A1 | 1/2004 | Smith et al. |
| 2004/0068479 | A1 | 4/2004 | Wolfson et al. |
| 2004/0078591 | A1 | 4/2004 | Teixeira et al. |
| 2004/0111499 | A1 | 6/2004 | Dobrowski et al. |
| 2004/0220924 | A1 | 11/2004 | Wootton |
| 2005/0155012 | A1 | 7/2005 | Tayama et al. |

FOREIGN PATENT DOCUMENTS

| | | |
|---|---|---|
| EP | 0 748 095 | 12/1996 |
| JP | 10-243018 | 9/1998 |
| WO | WO 92/19054 | 10/1992 |
| WO | WO 96/42041 | 12/1996 |
| WO | WO 01/33371 | 5/2001 |
| WO | WO 01/55873 | 8/2001 |
| WO | WO 01/55905 | 8/2001 |
| WO | WO 01/63835 | 8/2001 |

OTHER PUBLICATIONS

Supplementary European Search Report for EPO App. No. 00 90 7078, mailed May 18, 2004.

Roberts-Witt, S., The 1999 Utility Guide: Corporate Filtering, PC Magazine Online, Apr. 5, 1999, pp. 1-11.

Sequel Technology, Inc., Sequel and Surfwatch Partner to Provide Innovative Internet Resource Management Tools for Large Enterprises, Internet, Onlinel, Feb. 25, 1999, pp. 1-3.

SurfWatch Software, SurfWatch® Professional Edition: Product Overview, Internet, Online!, May 26, 1999, p. 1.

Newman, H., A Look at Some Popular Filtering Systems, Internet, Online!, Jun. 25, 1999, pp. 1-11.

Secure Computing Corporation, SmartFilter™ Web Tool, Dec. 1, 1998, pp. 1-2.

Sandhu, et al., Access Control: Principles and Practice, IEEE Communications Magazine, pp. 40-48, Sep. 1994.

C. L. Schuba and E. H. Spafford. Countering abuse of name-based authentication. In 22nd Annual Telecommunications Policy Research Conference, 21 pp., 1996.

SurfControl plc, SuperScout Web Filter Reviewer's Guide, 36 pp., 2002.

Yialelis, et al., Role-Based Security for Distributed Object Systems, Proceedings of the IEEE Fifty Workshops on Enabling Technology: Infrastructure for Collaborative Enterprises (WET ICE '96), 6 pp., Jun. 19-21, 1996.

* cited by examiner

| CATEGORY | NETWORK THRESHOLDS | | | | | | | |
|---|---|---|---|---|---|---|---|---|
| | WORK HOURS | | | | OFF WORK HOURS | | | |
| | ENGINEER | | ACCOUNTANT | | ENGINEER | | ACCOUNTANT | |
| | BOB | SUE | STEVE | MARY | BOB | SUE | STEVE | MARY |
| GAMES | 40 | 50 | 30 | 30 | 10 | 50 | 50 | 26 |
| HACKING | 10 | 2.5 | 30 | 1.5 | 20 | 20 | 1 | 0 |
| POLITICS | 0 | 20 | 18 | 20 | 1.25 | 20 | 10 | 0.75 |
| | | | | | | | | |
| NO CATEGORY | 1 | 1 | 6 | 2 | 2 | 70 | 0.5 | 50 |

| CATEGORY | NETWORK THRESHOLDS | | | |
|---|---|---|---|---|
| | WORK HOURS | | OFF WORK HOURS | |
| | ENGINEER | ACCOUNTANT | ENGINEER | ACCOUNTANT |
| GAMES | 60 | 6 | 4 | 80 |
| HACKING | 10 | 90 | 80 | 1 |
| POLITICS | 40 | 95 | 65 | 1 |
| | | | | |
| NO CATEGORY | 20 | 80 | 10 | 10 |

| CATEGORY | NETWORK THRESHOLDS ||
|---|---|---|
| | WORK HOURS | OFF WORK HOURS |
| GAMES | 5 | 90 |
| HACKING | 40 | 40 |
| POLITICS | 80 | 90 |
| | | |
| NO CATEGORY | 95 | 80 |

| NETWORK THRESHOLDS | BLOCKED CATEGORIES |
|---|---|
| 0 | SPORTS |
| 25 | SPORTS, GAMES |
| 50 | SPORTS, GAMES, HACKING |
| 80 | ALL NON-BUSINESS ACCESS |

| CATEGORY | CATEGORY THRESHOLDS | | | | | | | |
|---|---|---|---|---|---|---|---|---|
| | WORK HOURS | | | | OFF WORK HOURS | | | |
| | ENGINEER | | ACCOUNTANT | | ENGINEER | | ACCOUNTANT | |
| | BOB | SUE | STEVE | MARY | BOB | SUE | STEVE | MARY |
| GAMES | 4% | 5% | 3% | 3% | 1% | 5% | 50% | 26% |
| HACKING | 1% | 2.5% | 30% | 1.5% | 2% | 2% | 1% | 0% |
| POLITICS | 0% | 2% | 18% | 20% | 1.25% | 2% | 1% | 0.75% |
| | | | | | | | | |
| NO CATEGORY | 1% | 1% | 6% | 2% | 2% | 7% | 0.5% | 0.5% |

| CATEGORY | CATEGORY THRESHOLDS | | | |
|---|---|---|---|---|
| | WORK HOURS | | OFF WORK HOURS | |
| | ENGINEER | ACCOUNTANT | ENGINEER | ACCOUNTANT |
| GAMES | 9%(60% OF 15%) | 6%(40% OF 15%) | 4%(5% OF 80%) | 76%(95% OF 80%) |
| HACKING | 3.5%(10% OF 35%) | 31.5%(90% OF 35%) | 4%(80% OF 5%) | 1%(20% OF 5%) |
| POLITICS | 2%(5% OF 40%) | 38%(95% OF 40%) | 3.25%(65% OF 5%) | 1.75%(35% OF 5%) |
| | | | | |
| NO CATEGORY | 2%(20% OF 10%) | 8%(80% OF 10%) | 9%(90% OF 10%) | 1%(10% OF 10%) |

FIG. 4B

| CATEGORY | CATEGORY THRESHOLDS | |
|---|---|---|
| | WORK HOURS | OFF WORK HOURS |
| GAMES | 15% | 80% |
| HACKING | 35% | 5% |
| POLITICS | 40% | 5% |
| | | |
| NO CATEGORY | 10% | 10% |

*FIG. 4C*

| CATEGORY | CATEGORY THRESHOLDS |
|---|---|
| GAMES | 35% |
| HACKING | 5% |
| POLITICS | 50% |
| | |
| NO CATEGORY | 10% |

FILTERING TECHNIQUES FOR MANAGING ACCESS TO INTERNET SITES OR OTHER SOFTWARE APPLICATIONS

RELATED APPLICATIONS

This is a continuation application of application Ser. No. 10/010,282, filed Dec. 5, 2001, now U.S. Pat. No. 6,947,985, entitled FILTERING TECHNIQUES FOR MANAGING ACCESS TO INTERNET SITES OR OTHER SOFTWARE APPLICATIONS, which is hereby incorporated by reference in its entirety.

BACKGROUND OF THE INVENTION

1. Field of the Invention

This invention relates to systems and methods for managing use of a network, such as accessing Internet websites via a web browser or the use of other applications.

2. Description of the Related Art

The Internet is a global system of computers that are linked together so that the various computers can communicate seamlessly with one another. Internet users access server computers in order to download and display informational pages. Once a server has been connected to the Internet, its informational pages can be displayed by virtually anyone having access to the Internet.

The easy access and inexpensive cost of retrieving Internet pages has led to several problems for controlling access to inappropriate information, such as pornography. Several solutions to this problem have been proposed, including rating systems similar to that used for rating movies so that a parent or employer could control access to Internet servers, or pages, that have a particular rating. Unfortunately, this mechanism requires each person running an Internet server to voluntarily rate their site. Because of the free-wheeling nature of the Internet, this type of voluntary rating scheme is unlikely to be very efficient for preventing access to sites, such as those containing pornography, that most parents or businesses desire to block.

In addition to a rating scheme, others have developed databases that contain the uniform resource locator (URL) address of sites to be blocked. These databases are integrated into network computer systems and Internet firewalls so that a person wishing access to the Internet first has their URL request matched against the database of blocked sites. The user cannot access any URL found in the database. One such system is described in U.S. Pat. No. 5,678,041 to Baker et al. Unfortunately, such systems rely on the database of accessed sites to be complete. Because new servers are being added to the Internet on a daily basis, as well as current servers being updated with new information, these databases do not provide a complete list of sites that should be blocked.

In addition, current systems do not provide a user with any flexibility once they have requested a site that is within the blocked database. Thus, users that have a legitimate reason for reviewing such sites are still denied access.

SUMMARY OF THE INVENTION

The systems and methods have several features, no single one of which is solely responsible for its desirable attributes. Without limiting the scope as expressed by the claims which follow, its more prominent features will now be discussed briefly. After considering this discussion, and particularly after reading the section entitled "Detailed Description" one will understand how the features of the system and methods provide several advantages over traditional filter systems.

One aspect of the invention is a system for controlling user access to categories of Internet sites between a local area network and a wide area network. The system includes a categorized database of Internet sites, a first module configured to reference the categorized database and determine the category of Internet site that is being requested by a user, and a second module configured to determine a data transfer rate between the local area network and the wide area network. The system further includes a categorized database of threshold values and a third module configured to compare the data transfer rate to the categorized database of threshold values and, responsive to the comparison, blocking the user's further access to the site.

Another aspect is a method for controlling user access to categories of Internet sites between a local area network and a wide area network. This method comprises referencing a categorized database of Internet sites, determining the category of Internet site that is being requested by a user, and determining a data transfer rate between the local area network and the wide area network. The method further comprises comparing the data transfer rate to a categorized database of threshold values and responsive to the comparison, blocking access to the site.

DETAILED DESCRIPTION

The following detailed description is directed to certain specific embodiments of the invention. However, the invention can be embodied in a multitude of different systems and methods. In this description, reference is made to the drawings wherein like parts are designated with like numerals throughout.

Figure 1:
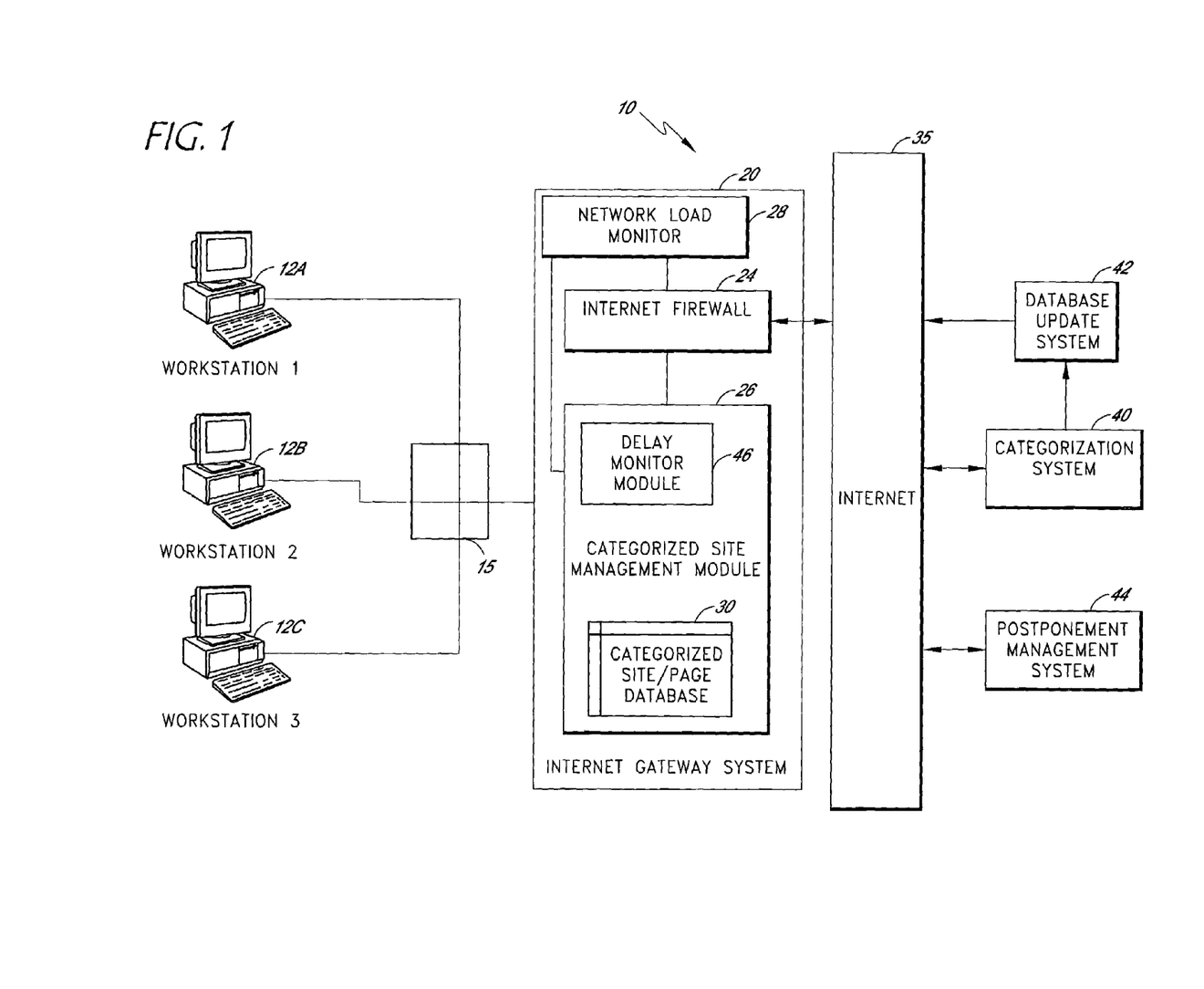
FIG. 1 is a block diagram of a system for controlling access to a network.

FIG. 1 is a block diagram of a system 10 for controlling access to a network. In the system shown in FIG. 1, the system is configured to control data flow between a network and the Internet. This flow can include data related to software applications. For example, data types that are related to software applications include data related to a website uniform resource locator (URL), instant messages, e-mails, audio files, video files, File Transfer Protocol (FTP), streaming audio, and streaming video. For ease of description, the systems and methods described below generally refer to controlling access to website URL related data. However, as explained above, the systems and methods described are not so limited.

When the system is configured to control data flow related to Internet sites, the system 10 does not simply allow or deny access to the Internet sites. A user can be provided with several options, or flexible filters, for accessing sites that are found within the categorized database. Examples of filtering techniques that can be used with the methods and systems disclosed herein are disclosed in U.S. patent application Ser. No. 09/494,315, filed Jan. 28, 2000, and entitled SYSTEM AND METHOD FOR CONTROLLING ACCESS TO INTERNET SITES, which is hereby incorporated by reference in its entirety. These filtering techniques can also be applied when the system is configured to control data flow associated with software applications.

As shown, a plurality of workstations 12A-C are connected through a local area network 15 to an Internet gateway system 20. The systems and methods described herein can be applied to systems that provide Internet connections. Generally, these types of systems have one or more Internet gateways that are shared by more than one workstation, machine, or user. For example, multiple LANs can be connected together to form a wide area network (WAN). The WAN would then connect to the Internet gateway system 20. In cases where the LAN's bandwidth is greater than the WAN's bandwidth connection to the Internet, the systems and methods described herein would be applied to the WAN's connection as it is the limiting connection to the Internet. For ease of description, the following describes systems and methods for controlling access from a LAN to the Internet where the LAN connection is the limiting connection. However, as explained above, the systems and methods described are not so limited.

The workstations 12A-C can be personal computers operating, for example, under the Microsoft Windows Operating System. However, other computers, such as those manufactured by Apple, IBM, Compaq, Dell, Sun Microsystems or other system, can be used.

The local area network 15 can be an Ethernet 10baseT topology, or based on any networking protocol, including wireless networks, token ring network, and the like. The local area network 15 communicates with the Internet Gateway system 20 in order to provide the workstations 12 A-C with communication, for example TCP/IP to sites on a wide area network, for example, an Internet 35. Such gateways are well known in the art and normally communicate through routers or other data packet switching technology for translating Internet TCP/IP protocols into the proper protocols for communicating across the local area network 15.

Within the Internet gateway system 20 is an Internet firewall module 24 that monitors data packets flowing to and from the Internet 35. The firewall module 24 controls access between the workstations 12A-C and the Internet so that unauthorized users cannot gain access to computer resources on the local area network 15. Thus, all communications between the Internet and the local area network 15 first pass through the firewall 24. The firewall module 24 can be one of the many firewall software programs commercially available, such as Firewall-1 (Check Point software, Redwood City, Calif.). However, it should be realized that while the embodiment described in FIG. 1 relies on a firewall to control access of data packets between the Internet and the workstations 12A-C, other similar access control systems are available and can be used. For example, the Microsoft proxy server (Microsoft Corp., Redmond, Wash.), Netscape proxy server (Netscape Corp) and the Cisco PIX Firewall (Cisco Corp.) are currently available and can be implemented in place of the firewall 24. Alternatively, a caching device can be utilized to provide access control. For example, the Inktomi Traffic Server (Inktomi Corp.) and the Network Appliance NetCache (Network Appliance Inc.) can be used.

The term "module," as used herein, means, but is not limited to, a software or hardware component, such as a FPGA or ASIC, which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers.

Within the Internet gateway system 20, and communicating with the firewall 24, is a categorized site management module 26 that analyzes Internet site requests from the workstations 12A-C and then compares those Internet site requests with a categorized site/page database 30. The URL for the source page of the requested Internet site is categorized into one or more of several categories. A URL is the address of a computer or a document on the Internet that consists of a communications protocol followed by a colon and two slashes (as http://), the identifier of a computer (as www.m-w.com) and usually a path through a directory to a file. If the requested page is found within the database 30, it will either be blocked or allowed depending on the access rights granted to the user within the categorized site management module 26. As illustrated, the categorized site management module 26 communicates with the firewall 24 to allow or control access to the Internet 35.

Alternatively, the categorization site management module can analyze content or other aspects of a communication in determining whether to block or allow a user's access to the communication. For example, the categorization site management module can monitor the textual or graphical content of an e-mail message and accordingly screen the message from being accessed by the intended recipient.

Alternatively, the categorization site management module analyzes requests from the workstations 12A-C for data files that are associated with specific software applications. The categorization site management module detects the use of a particular software application by the presence of its associated protocol on the network and analyzes the protocol data to determine what data, resources, or other services are being requested via the network. Resources can include, for example, any file, image, data stream, or other data accessible via the network or locally. Services are any function performed on behalf of a requester, for example, retrieval of a file, transfer of video data, transmission of messages, or other data manipulation. The use of the application itself, or access to the requested data resources or services is then allowed or denied based on access rights granted to the user within the categorization site management module 26.

Also located within the Internet gateway system 20 is a network load monitor module 28. The network load monitor module 28 monitors data packets flowing between the local area network 15 and the Internet 35. The network load monitor module can access the system 10 at a location where all of the packets are funneled through in order to monitor packet flow. In FIG. 1, the network load monitor module accesses the system 10 at the Internet firewall 24. In a system with more than one Internet gateway or access point to the Internet, network load monitor modules can be located at each access point within the system 10 such that the total packet flow observed by the multiple network load monitor modules collectively represents the total load between the local area network and the Internet. The network load monitor module can be configured to monitor traffic within a local area network.

In one embodiment, the network load monitor module categorizes the data packets flowing between the local area network and the Internet based on the content of the data packets. This categorization can be performed in conjunction with the categorized site/page database 30 described above. Once categorized, the network load monitor module determines the portion of the entire network load that is attributable to each category.

The network load monitor module can use passive techniques to provide visibility into the network traffic by capturing and identifying packets. Common terms for such passive techniques include non-obtrusive, packet capture, packet sniffing, and promiscuous-mode packet capture. These passive techniques detect the use of various software applications on the network by monitoring data traffic in the form of, for example, packets generated by the software applications. The network load module identifies a specific software application by recognizing the network protocol that the software application employs to send its data through the network. For example, each instant messaging software application uses an application specific communications protocols that is identified by the network load module. While observing all of the network packets traversing the network, the system uses counters (not shown) to measure the bandwidth utilization of the software applications.

Alternatively, a network activity client (not shown) can provide the bandwidth usage to the network load monitor module 28. The network load monitor module 28 can also access a network load management system (not shown), via the local area network 15, to obtain information on bandwidth usage. The network load management system can be, for example, a server with access to the firewall 24 to measure the bandwidth usage of the local area network 15.

The network's bandwidth usage is a single value or, alternatively, can be multiple values corresponding to various subsets of the network's bandwidth usage. For example, the network load monitor module can determine the current bandwidth usage for each of one or more categories of Internet pages/sites. Additional subsets include bandwidth usage per employee classification and bandwidth usage per individual employee. The network load monitor can determine bandwidth usage for network traffic associated with a specific software application. The network load and the subsets can each be in the form of, for example, a percentage of the network's maximum throughput. The usage values can also be measured as bit rates.

Also connected to the Internet 35 is a categorization system 40 that categorizes websites and pages in order to create the categorized site database 30. Once sites on the Internet have been categorized by the categorization system 40, a database update system 42 thereafter routinely copies the updated database from the categorization system 40 to the Internet gateway system 20. As can be imagined, the system can include thousands of gateway systems, each of which is updated regularly by the database update system 42 to provide an updated database of blocked Internet sites. Moreover, the database update system 42 transfer portions of the database to the gateway system 20 so that the entire database does not need to be transmitted.

Also communicating with the Internet 35 is a postponement management system 44 that manages Internet sites and communication data related to software applications that have been saved for postponed access by users. As will be explained, the system provides users with the ability to store desired Internet site URLs for review at a later time. Users can also store other communication data that is associated with software applications. The postponement management system 44 can reside on the local area network 15.

Also located within the Internet gateway system 20 is a delay monitor module 46. The delay monitor module 46 monitors the responsiveness of the categorization site management module 26 in determining whether to block or allow a user's request for a site/page. A delay in accessing a requested site/page can occur due to, for example, whether sufficient computer related resources are available to timely process the user's request or whether there is an existing backlog of site/page requests to the categorization site management module. These conditions can reduce a user's satisfaction by delaying access to their requested site. Moreover, a local area network 15 could become bogged down with a plethora of simultaneous user requests whereby the network's stability could be compromised.

Once a user's request for a website is received by the firewall, the firewall forwards the request to the categorization site management module. The firewall waits until the categorization site management module determines whether to allow access to the requested site/page. Based on the categorization site management module's determination, access to the requested site/page may or may not be allowed. Thus, the user's request "passes-through" the categorization site management module and the firewall.

Alternatively, when the categorization site management module is unable to determine whether the requested page/site is associated with a category within a predetermined time, the delay monitor module 46 limits the operation or service level of the categorization site management module. By limiting the service level, the responsiveness of the categorization site management module can be improved. Alternatively, the delay monitor module 46 gradually degrades the level of service as the response time of the categorization management module increases. Additional features of the categorization site management module could be bypassed if its responsiveness continues to degrade. For example, the application of rules associated with individual users or group of users could be bypassed. The categorization site management module could then fall back on a default global policy that is applied irrespective of user. Additional reductions in the level of service can include certain categories of sites/pages being allowed or limiting the options available to the categorization site management module. For example, the option for postponing access could be deactivated while keeping the block or allow options available to the categorization site management module. The delay monitor module could limit the use of certain high-bandwidth applications. For example, the use of streaming video or audio could be controlled.

In one embodiment, the delay monitor module defaults and allows the user access to the page. In this embodiment, the requested page/site "bypasses" the categorization process. The categorization process can then continue in parallel or after the access is granted whereby the system's transparent nature to the user is maintained. Alternatively, the delay monitor module 46 applies the network load module (see FIG. 2) when the categorization process is not completed. For example, the network load module uses the network threshold value associated with the category labeled "no category" in FIG. 3. A log of when a request exceeds the predetermined delay can be made to allow the system administrator to dynamically evaluate their resources. The process for determining whether a user's request "passes-through" or "bypasses" the categorization site management module is illustrated in detail in FIG. 6.

Figure 2:
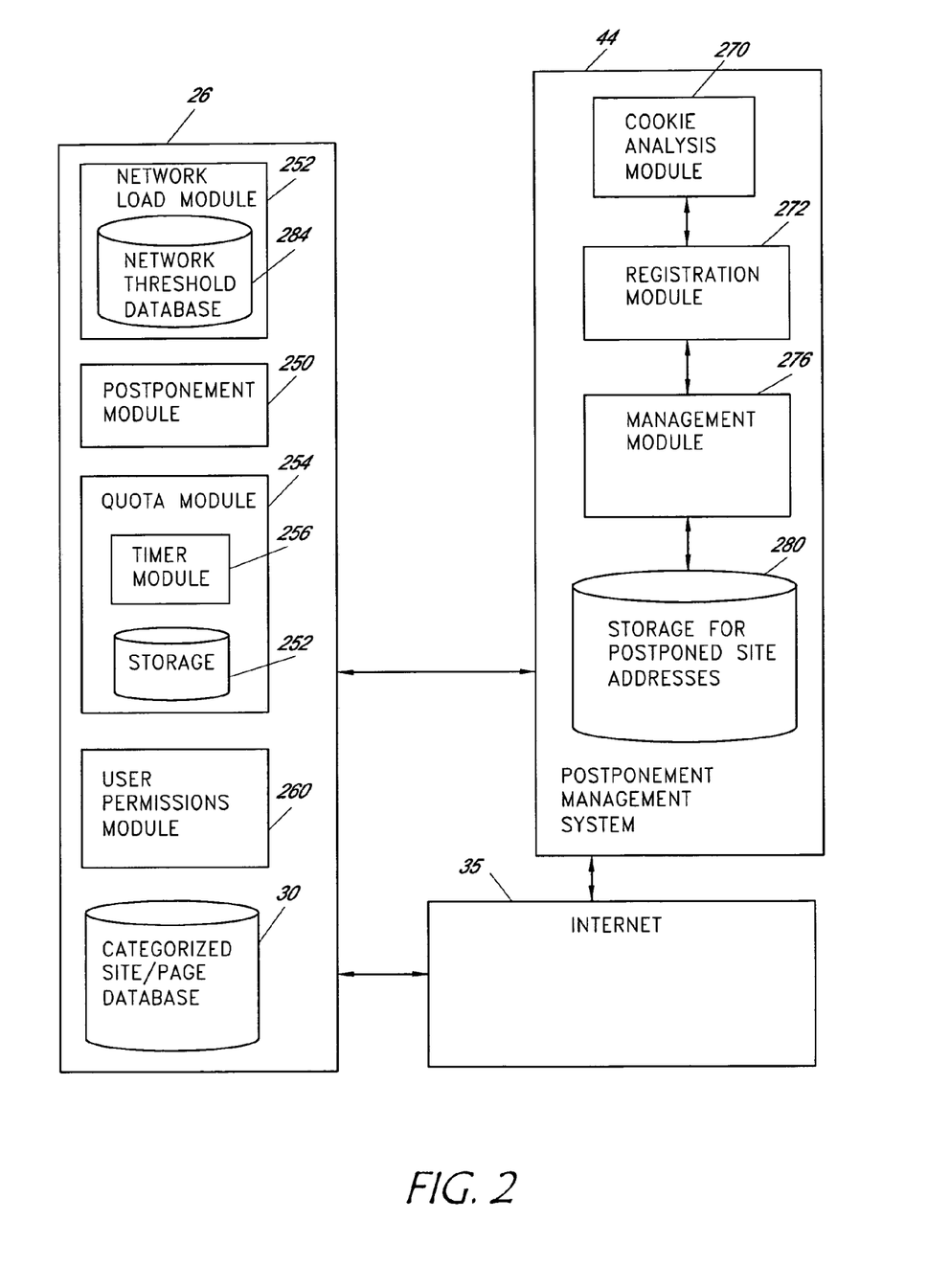
FIG. 2 is a block diagram of a system for providing flexible filtering of network-based software application transactions.

FIG. 2 is a block diagram of a system for providing flexible filtering of network-based software application transactions. The system can also provide flexible filtering for requests for resources or services associated with any software application, including requests for Internet sites via a web browser. The categorized site management module 26 includes a postponement module 250 that includes instructions for providing the system with its ability to postpone access to specific sites on the Internet. For example, in one embodiment, the user is presented with the option of postponing access to the desired site until another time of the day. If the user chooses to postpone access, a copy of the requested URL, and, in some cases, pages, are copied to a database, for example, residing on an Internet server. Users can store references to resources or services that are associated with specific software applications. The user is then allowed access to the database at a later time of the day. This system grants employers the ability to provide users with access to, for example, sport sites or instant messaging, but only during lunch or after work.

Also within the categorized site management module 26 is a quota module 254. The quota module 254 includes instructions and commands for determining whether a user has exceeded a particular quota. In one embodiment, the quota module 254 limits user access to categories of Internet sites. For example, if a user spends more than the predetermined amount of time on a particular site, they will be barred from accessing that site, or category of sites, for the rest of the day. Of course, the time schedule can be set to any combination of time that is preferred by the employer. In addition, a maximum number of times that the user visits a site that is within a particular category can also be controlled. Thus, a user might be allowed only 10 visits to a sports site within any 24-hour period.

Alternatively, the quota module limits access to Internet sites independent of the category of the requested Internet site. For example, the quota module can limit user access to the Internet based on a maximum bandwidth limit associated with each user. In another embodiment, the quota module limits access to Internet sites based on a maximum number of hits per time period for each user. The quota module can also provide data traffic limits for a particular software application. Examples of quota limits associated with software applications include number of instant messages, number of files transferred, number of songs, or other quantum of information associated with the software application.

The particular quota limit can be based on, for example, a predetermined amount of time, total number of bytes transferred by the user, bit rate, and number of hits per time period. The quota limit can also be limited by, for example, the category associated with the requested site/page and/or the software application associated with a received or transmitted data packet.

Time dependent quota limits can utilize a timer module 256. The quota module 254 can also include a data storage 258 configured to record the number of times a particular user has accessed a particular category of Internet sites, or the amount of time a user has spent reviewing that particular category.

The management module 26 also includes a user permissions module 260. The user permissions module 260 determines whether a particular user is restricted from accessing particular categories of sites. The user permissions module 260 also determines whether a user is subject to the requirements of the postponement module 250, the quota module 254, and/or the network load module 252. The user permissions module 260 can also determine whether the user is restricted from using a particular software application.

The user permissions module can notify the user that their access to the chosen site will be logged for review. If the user has a legitimate reason for accessing the site, they will not be blocked. However, users without legitimate reasons for accessing the desired site will be allowed to cancel their site request and not be logged as having requested the site.

Also within the categorized site management module 26 is a network load module 252. The network load module 252 determines whether a predetermined network load threshold value associated with a user's request has been exceeded. The user's request can be in the form of a uniform resource locator ("URL") or other identifier associated with the information requested by the user. The network load threshold module 252 can also determine whether a predetermined network load threshold value associated with a software application type has been exceeded.

The network load threshold values can vary during the day, and may also vary for different categories of users. For example, the network load threshold values for a company's Communications Department may be higher for Internet pages/sites in a "Politics" category. Further embodiments vary the network load threshold values for each specific user thereby allowing a system administrator to customize the bandwidth available to each user in each category.

Communicating with the management module 26 is the postponement management system 44. This system 44 is normally running within a server attached to the Internet 35. The postponement management system 44 postpones access to Internet sites. The postponement management system 44 can also postpone access to resources or services related to software applications requested by particular users. Within the postponement management system 44 is a cookie analysis module 270 that provides instructions for determining the identity of the user currently accessing the system. As is known, "cookies" are data strings stored on a user's computer that can include specific user identification numbers. These unique user identification numbers allow the postponement management system 44 to know the identity of the user currently accessing the system. The unique user identification numbers are accessed by the network load module to determine the identity of the user currently accessing the system.

In communication with the cookie analysis module 270 is a registration module 272 that is provided to allow new users to register within the postponement management system. Thus, if a cookie is not found on the user's computer, the user is directed towards the registration module 272 in order to register for access to the postponement management system 44.

The postponement management system 44 also provides a management module 276 that oversees user's access to postponed sites within the system 44. Thus, when a user attempts to access their stored site, the management module 276 determines the appropriate stored sites and directs the user to those stored pages. As illustrated, the management module 276 communicates with a storage 280 which holds the actual pages that were postponed from a previous viewing attempt by the user.

To request access to an Internet page or site, a user utilizes an Internet browser on a workstation computer 12A-C. Well-known browsers include Microsoft Explorer and Netscape Navigator. The browser request is normally made after a user has entered a desired URL into their browser software. The user's request is then sent across the local area network 15 to the Internet Gateway system 20. The requested Internet address is matched against the categorized database 30. It should be noted that the address could be a single page within an Internet site, or the default address of the site (e.g.: www.company.com).

The categorized site management module determines whether an address match has been made with any address stored in the categorized database. If no match was found within the categorized database 30, the requested page is retrieved from the Internet. However, if an address match between the requested address and the categorized database is found, the categorization site management module determines whether the current user has restricted access rights to specific categories of Internet pages. This determination can be made by reference to a list of network users, and an associated permissions table for each category found within the categorized database. Thus, a particular user may be restricted from access to all Sports and Pornography categories but not restricted from Internet Commerce or Travel categories. If the user has restricted categories, the categorized site management module determines which categories have been blocked for this particular user by referencing the permissions list associated with the user.

The categorized site management module determines whether the requested page is within any of the restricted categories for this particular user. If the requested page is not within one of the user's restricted categories, the requested page is retrieved. If the requested page is within one of the user's restricted categories, access to the page is blocked. This blocking can occur by returning a pre-defined block page to the user's browser explaining that the request is not allowed and why. Alternatively, the categorized site management module simply closes the connection that was requested by the Internet browser to the requested page.

The network load module 252 receives a current network load associated with the data flowing between the local area network and the Internet from the network load monitor module. The network load module 252 can poll the network load monitor module 28 for the current network load. Alternatively, the network load monitor module periodically sends the current network load to the network load module.

The network load module 252 also selects a network threshold value from a network threshold database 284. The selected network threshold value is associated with the category of the user's requested site/page. Alternatively, the selected network threshold value is associated with the software application type of the user's requested resource or service. The network threshold database 284 permits a network administrator to select threshold limits which, as the network utilizes more and more of its bandwidth, ensure that unused bandwidth will be available for, for example, work related activity. The network threshold database 284 includes predetermined values associated with network load limits for each Internet site/page category. These network threshold values can vary, for example, between zero and 100 percent of the network's capacity. For each Internet site/page request, the network load module 252 retrieves a value associated with the category of the requested page/site from the network threshold database.

The network load module compares the value associated with the requested Internet site/page with the current network load to determine whether to allow the user access to the requested Internet site/page. If the current network load exceeds the network threshold value associated with the category requested by the user, the user's request will be denied. The process for determining whether a user's request will exceed a predetermined network threshold value is illustrated in detail in FIG. 5.

Alternatively, the network load module 252 includes a category threshold database (not shown). The category threshold values represent a portion of the network's bandwidth that has been pre-allocated to an individual category or group of categories. For each Internet site/page request, the network load module 252 retrieves a value associated with the requested Internet page/site from the network threshold database. The network load module retrieves a current network load attributed to the requested category from the network load monitor module (see FIG. 1). The network load module compares the value associated with the requested Internet page/site with the current network load to determine whether to allow the user access to the requested Internet site/page. The category threshold database permits a network administrator to select threshold limits which, as the network utilizes more and more of its bandwidth, ensure that a maximum portion of the network's bandwidth will be used for each category of Internet site/pages.

Alternatively, the network load module 252 includes the network load monitor module 28. By locating the network load monitor module within the categorized site management module 26, the system's integration is enhanced. However, such a configuration is not required.

Figures 3, 3A:
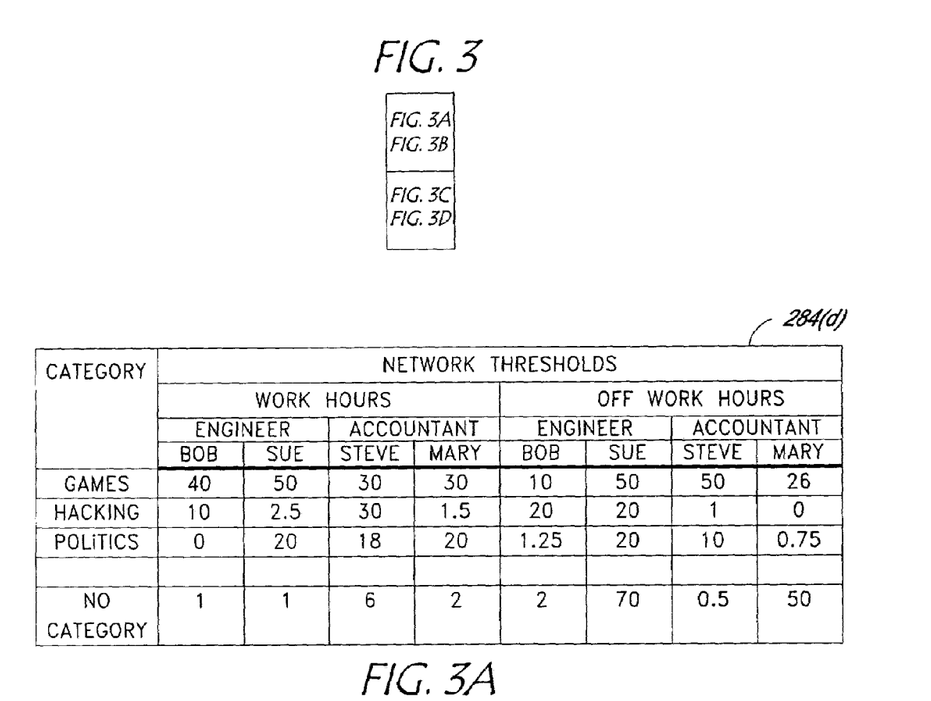
FIG. 3 is a representation of four alternate embodiments of a network threshold database.
Figure 3B:
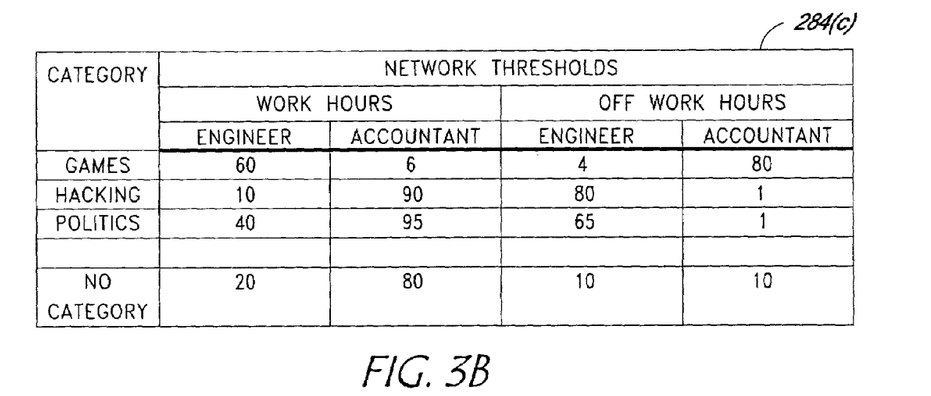
Figure 3C:
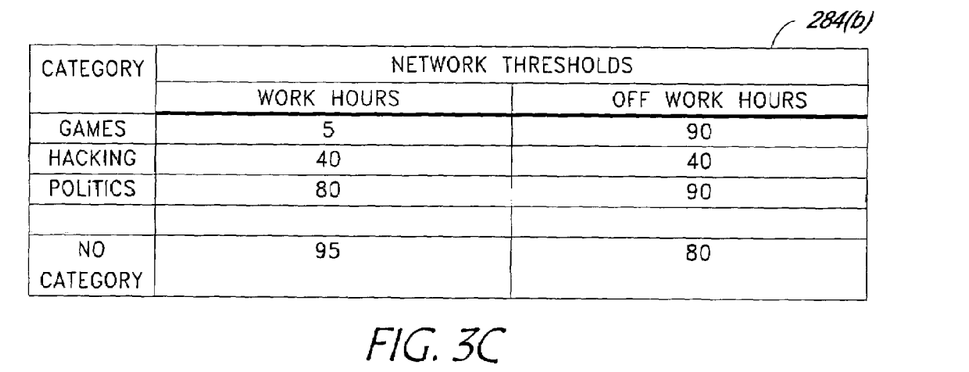
Figure 3D:
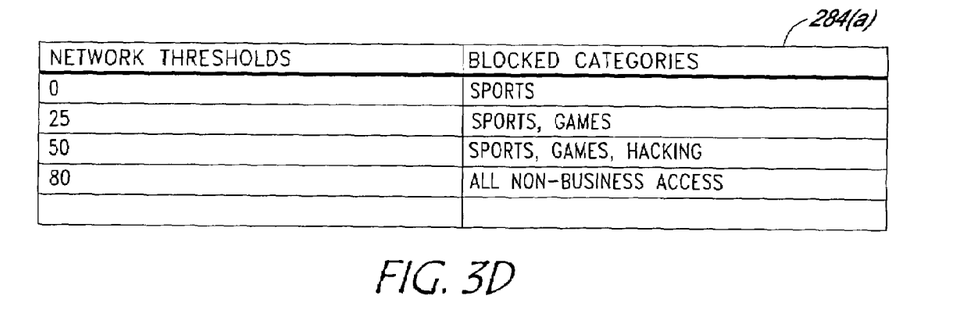

FIG. 3 is a representation of four alternate embodiments of a network threshold database. Each embodiment includes a two-dimensional data array of network threshold values. For example, network threshold database 284(a) includes the network threshold values 0, 25, 50, and 80. Each of these network threshold values corresponds to a group or groups of Internet page/site categories. For example, network threshold database 284(a) lists the categories of sports, games, hacking, and all non-business access along with their corresponding network threshold values, 0, 25, 50, and 80, respectively. The network threshold value 25 corresponds to a combination of a games group with a sports group. Together, each network threshold value and its corresponding Internet page/site category represent a predetermined limit on additional usage of the network's bandwidth for that Internet page/site category. The threshold values are shown in percentages but can be in the form of, for example, bit rates.

Applying the network threshold database 284(a), once the network is at 50 percent of its capacity, future user requests for Internet sites/pages that are categorized as either games, sports, or hacking will be blocked. Once the network reaches 80 percent capacity, all non-business access will be blocked. In other words, the system will maintain at least 20% of the network's bandwidth for work related business regardless of how the initial 80% of the network's bandwidth is being used.

The alternate threshold database 284(b) includes network threshold values which are used by the network load monitor to deny or allow access to sites/pages based on whether the request is made during or after work hours. For example, network threshold database 284(b) includes a time of day subset, whereby the system is able to vary the network threshold values for work hours as opposed to off work hours. In this example, during work hours, once 5 percent of the local area network's bandwidth is used, requests for Internet sites/pages categorized within the category of games will be blocked. The network threshold value for the category of games is raised to 90 percent after work hours. Thus, until 90 percent of the network's bandwidth is being utilized after work hours, requests to the system for access to sites/pages that are categorized as games will be allowed.

The alternate threshold database 284(c) includes network threshold values that are used by the network load monitor to deny or allow access to sites/pages based on the requester's employee classification. For example, to limit impact on the network due to game playing by users that are classified as accountants, the system denies access to requests for such sites once the network's bandwidth usage reaches 6 percent during the day. Continuing with this example, the engineers are able to access game sites during work hours until the network's bandwidth usage reaches 60 percent. During off work hours, the accountants are allowed to access Internet sites/pages that are categorized under gaming as long as the network's bandwidth usage is below 80 percent.

The alternate threshold database 284(*d*) includes network threshold values that are used by the network load monitor to deny or allow access to sites/pages based on the identity of the user. Thus, in this example, Bob is banned from accessing Internet pages/sites that are categorized under politics during work hours. The system does allow Bob to access such pages/sites until the network's bandwidth usage reaches 1.25 percent during off work hours. Numerous other subsets and combinations of subsets can be used. This process of determining access to a requested Internet site/page based on network load and network thresholds values will be explained more completely below with reference to FIG. 5.

Figures 4, 4A:
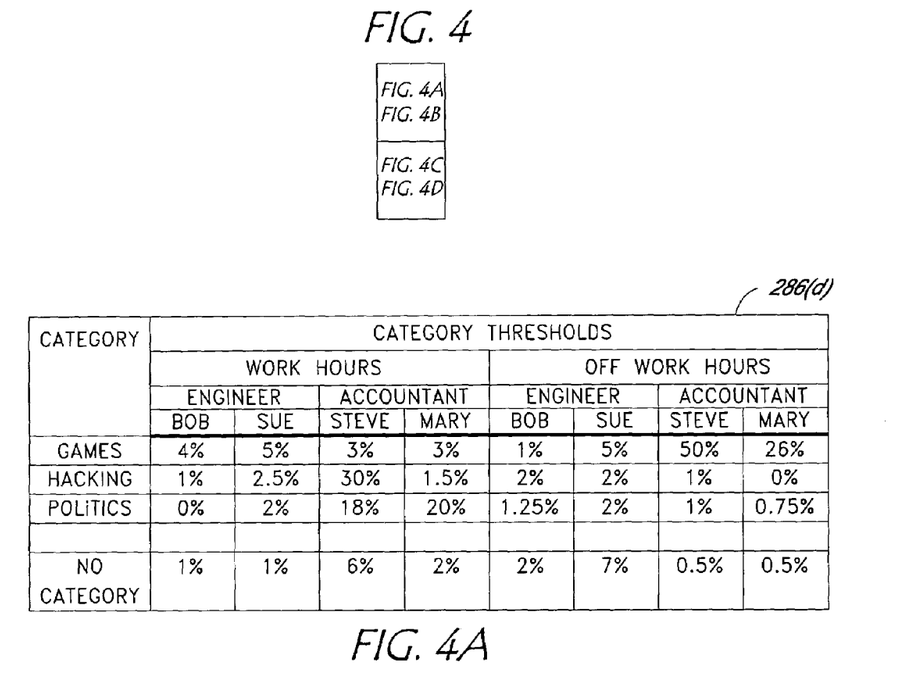
FIG. 4 is a representation of four alternate embodiments of a category threshold database.
Figure 4B:
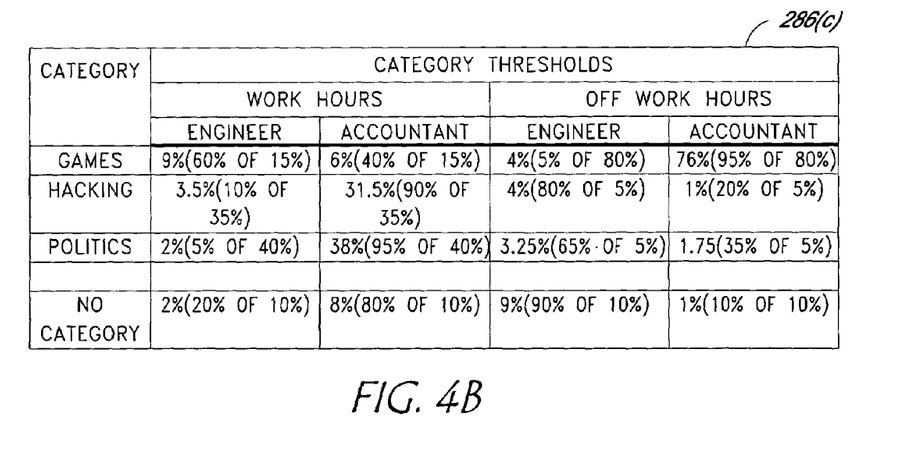
Figure 4C:
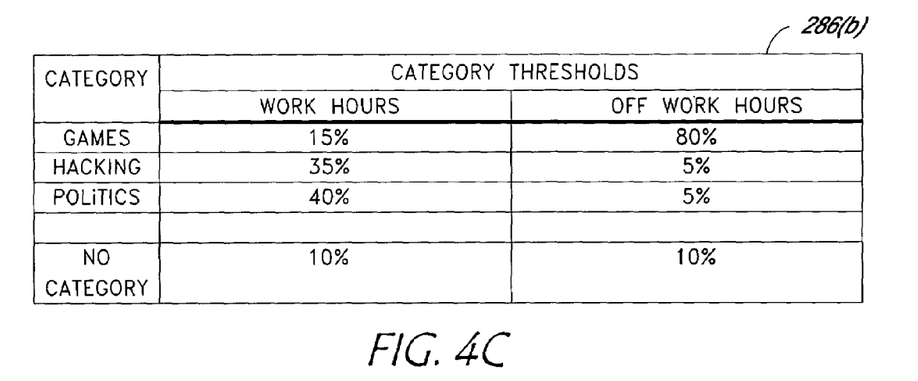
Figure 4D:
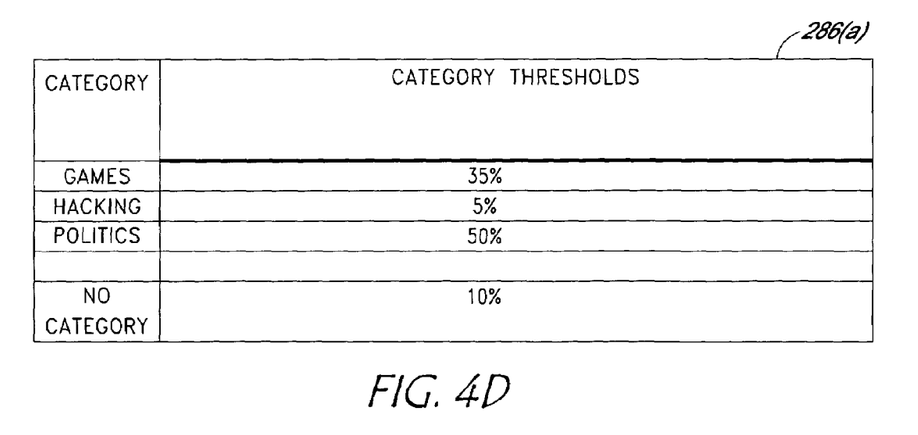

FIG. 4 is a representation of four alternate embodiments of a category threshold database. Each category threshold database 286(*a*)-(*d*) includes a two-dimensional data array. Each data array further includes category threshold values which represent a portion of the network's bandwidth that has been pre-allocated to a specific category. These values are shown in percentages but can be in the form of, for example, bit rates. Each data array lists the applicable categories along with their corresponding threshold values. For example, data array 286 (*a*) lists the categories of games, hacking, politics, and "no category" along with their corresponding category threshold values, 35%, 5%, 50%, and 10%, respectively. For example, the value 35% indicates that a maximum of 35% of the local area network's bandwidth or the wide area network's bandwidth can be used for accessing Internet sites/pages that are categorized by the categorization site management module 26 to be within the game category.

The alternate threshold database 286(*b*) includes category threshold values which are used by the network load monitor to deny or allow access to sites/pages based on whether the request is made during or after work hours. For example, data array 286(*b*) includes a time of day subset, whereby the system is able to vary the category threshold values for work hours as opposed to off work hours. In this example, during work hours, 15% of the local area network's bandwidth or the wide area network's bandwidth is allocated for Internet sites/pages that are categorized as games. To allow users to immerse themselves into an online battle as a team against the forces of evil, additional bandwidth is allocated for games after work hours.

The alternate threshold database 286(*c*) includes category threshold values that are used by the network load monitor to deny or allow access to sites/pages based on the requester's employee classification. For example, to limit users that are classified as accountants in their game playing at work, the system sets the maximum amount of bandwidth available for such activity to 6% during the day. At the same time, the engineers are able to indulge themselves up to a maximum threshold value of 9%. Recognizing the importance of gaming, the accountants are allowed to access Internet sites/pages that are categorized under gaming for up to 76% of the network's entire bandwidth during non-work hours. However, if the accountants are using 76% of the network's bandwidth for games, any additional requests by the accountants for Internet site/pages categorized as games will be denied.

The alternate threshold database 286(*d*) includes category threshold values that are used by the network load monitor to deny or allow access to sites/pages based on the identity of the user. Thus, in this example, Bob is banned from accessing Internet pages/sites that are categorized under politics during work hours. Bob has a proclivity for such sites. By limiting Bob's access during work hours to such sites, Bob has improved his productivity. While recognizing that Bob's inclination to view such sites during work hours could be detrimental to his career, the systems does allow Bob to use up to 1.25% of the network's entire bandwidth during off work hours to quench his thirst for the body politic. Thus, the category threshold database permits a network administrator to select portions of the available network's bandwidth and allocate such portions for individual categories. Numerous other subsets and combinations of subsets can be used beyond the embodiments described herein.

Figure 5:
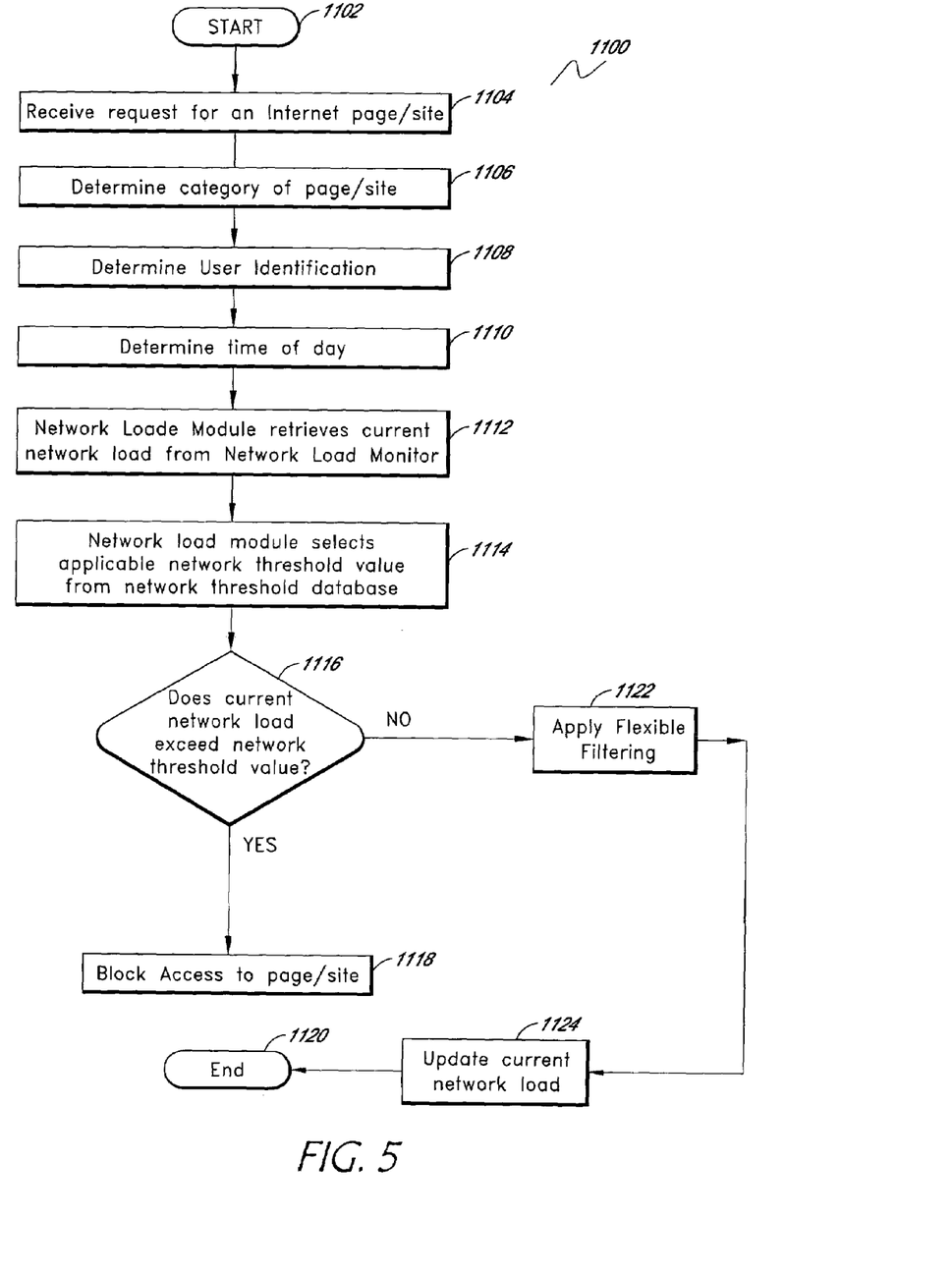
FIG. 5 is a flow diagram illustrating a process for determining the current network load for a category of Internet sites, and blocking access to that category once a predetermined threshold has been reached.

FIG. 5 is a flow diagram illustrating a Network Load Process 1100 performed by the categorization site management module for determining the current network load for a category of Internet sites, and blocking access to that category once a predetermined threshold has been reached. The network load process 1100 begins at a start state 1102 and then moves to a state 1104 wherein the categorized site management module receives a request for an Internet page or site. The categorized site management module determines the category of the page or site at a state 1106 by reference to the categorized database 30. In cases where a user's request is not associated with a category, the current network load is compared to a default maximum network threshold value. For example, the system can deny access to a page/site if such access would result in falling below a minimum amount of network bandwidth margin. The minimum bandwidth margin could be, for example, 10%.

The process 1100 then moves to a state 1108 wherein a user's identification is determined by the categorization site management module 26. The user's identification can be in the form of an Internet Protocol address. The Internet protocol address is assigned to the workstation 12A-C from where the user's request originated and is included with the request for the Internet site/page. The Internet protocol address is associated with a user's name. An employee's classification is then determined from the user name.

A determination is made at a state 1110 by the categorization site management module 26 as to the time of day that the Internet page/site request was made. The process continues to a state 1112 where the network load module retrieves the current network load from the network load monitor module 28. The current network load is in the form of a percentage of the entire network's bandwidth. Alternatively, the network load is in the form of a data bit rate.

The process continues to a state 1114 where the network load module selects the applicable network threshold value in reference to the network threshold database 284. The applicable network threshold value depends on, for example, the determination of the category in state 1106, the user's identification in state 1108, and the time of day in state 1110. A few or all of these factors may be used in selecting the applicable network threshold value. If the network threshold database 284(*c*) includes network threshold values that differentiate between work and off work requests, the time of day determined at state 1110 is used to select the applicable network threshold value. If the network threshold database 284 (*c*) further differentiates between classifications of employees, the classification determined at state 1108 is used to select the applicable network threshold value. For example, based on a request from an accountant for an Internet site that is categorized under politics made during work hours, the network threshold module would select 95 as the applicable network threshold value.

Alternatively, the network load module 252 determines whether a user's request for an Internet page/site will exceed the predetermined threshold values for accessing pages/sites on the Internet. The system evaluates the potential load on the network due to the user's request for the Internet site/page.

Instead of receiving request for websites/pages, the network load monitor module can use passive techniques to provide visibility into the network traffic by capturing and identifying network packets associated with software application protocols. These passive techniques detect the use of various software applications on the network by monitoring data traffic in the form of, for example, packets generated by the software applications. The network load module identifies a specific software application by recognizing the network protocol that the software application employs to send its data through the network. For example, each instant messaging software application uses an application specific communications protocols that is identified by the network load module. When analyzing resources or services, the network load module compares a protocol associated with the requested resource or service to a database of software applications (not shown). If the requested resource or service's protocol is found within the database of software applications, the network load module selects a network threshold value at state 114 that is associated with the software application type of the user's requested resource or service. Access to the resource or service will be either blocked at state 1118 or allowed at state 1122 depending on the access rights granted to the user.

The process 1100 then moves to a decision state 1116 wherein the network threshold module compares the current network load determined at state 1112 with the selected network threshold value determined at state 1114.

If a determination is made at decision state 1116 that the current network load exceeds the selected network threshold value, the process continues to a state 1118 where access to the requested Internet site/page is blocked. The process then continues to an end state 1120.

Returning to the decision state 1116, if the current network load does not exceed the selected network threshold value, the process moves to a state 1122 where one or more flexible filtering techniques are applied. Alternatively, the network threshold process retrieves the requested Internet page/site for the user. The process proceeds to a state 1126 where the network load monitor module updates the current network load. Flow then proceeds to the end state 1120.

It should be noted that if the network load module includes a category threshold database instead of a network load database 284, the network load process 1100 follows similar states except for 1112, 1114, and 1116. At state 1112, the network load module retrieves a current category network load for the requested category. The current category network load represents a portion of local area network's bandwidth that is being used to access the requested category. This is in contrast to a current network load which is the total bandwidth that is being used by the local area network in accessing the Internet. At state 1114, the network load module retrieves an applicable category threshold value from the category threshold database. The values determined at states 1112 and 1114 are then compared at state 1116.

Figure 6:
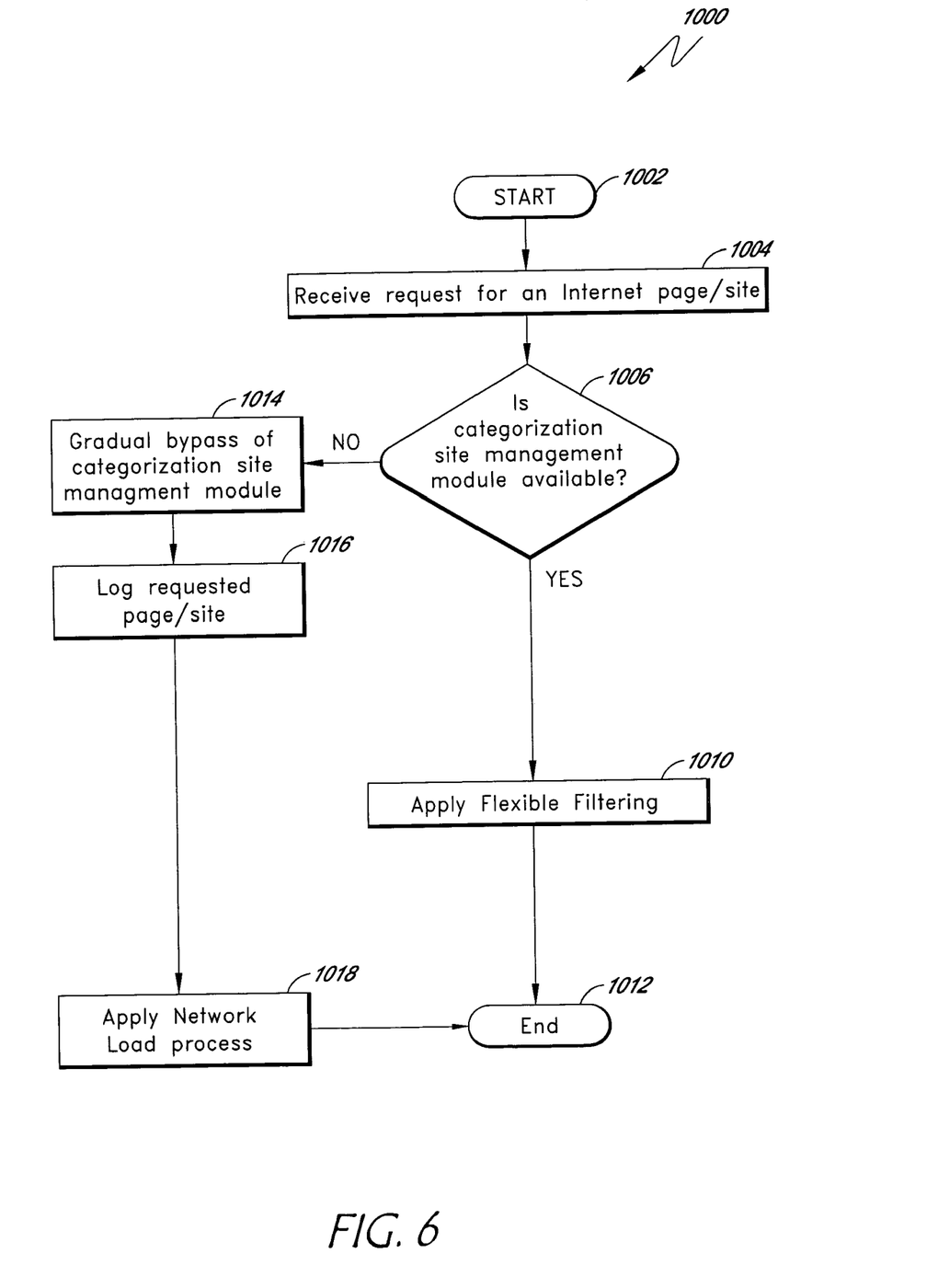
FIG. 6 is a flow diagram illustrating a reduction of service process that reduces the level of service provided by the categorization system for a requested Internet site/page.

FIG. 6 is a flow diagram illustrating a reduction of service process 1000 that reduces the level of service provided by the categorization system in response to a request for an Internet site/page. The process 1000 gradually bypasses the categorization analysis for a requested Internet site/page to increase the system's responsiveness. The process 1000 begins at a start state 1002 and then moves to a state 1004 wherein the categorization site management module receives a request for an Internet page or site. The delay monitor module determines at a decision state 1006 whether the categorization site management module is available for determining which category is related to the requested Internet page or site. Alternatively, the delay monitor module measures the response time of the categorization site management module.

If a determination is made that the categorization module is available, the process 1000 then moves to a state 1010 wherein one or more flexible filtering techniques are applied. Examples of flexible filtering techniques include the network load process 1100 described above as well as the filtering techniques described in already incorporated U.S. patent application Ser. No. 09/494,315, filed Jan. 28, 2000, and entitled SYSTEM AND METHOD FOR CONTROLLING ACCESS TO INTERNET SITES. The process terminates at an end state 1012.

If the delay monitor module determines, at decision state 1006, that the categorization site management module is unavailable or will not timely respond, the process proceeds to a state 1014 where the categorization process is gradually bypassed. The delay monitor module 46 gradually degrades the level of service as the response time of the categorization management module decreases. For example, additional features of the categorization site management module could be bypassed if its responsiveness continues to degrade. For example, the application of rules associated with individual users or group of users could be bypassed. The categorization site management module could then fall back on a default global policy that is applied irrespective of user. Additional reductions in the level of service can include certain categories of sites/pages being allowed or limiting the options available to the categorization site management module. Thus, if the categorized database 30 is unavailable or will not respond in a timely manner in determining the category of the requested Internet page/site due to, for example, concurrent requests from multiple users, the user does not have to wait until the categorized database is available. This provides a mechanism for increasing the responsiveness of the system. The categorization process can then continue in parallel, whereby the system's transparent nature to the user is maintained.

The process continues to a state 1016 where the user's site request, user name, date and time is recorded to a database via a logging module (not shown), or written to a log file. The process then moves to a state 1018 where a network load process is applied to the requested site/page. The network load module uses the network threshold value associated with the category labeled "no category" in FIG. 3. The Bypass Process 1000 then terminates at the end state 1012.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A system comprising:
   at least one processor;
   a first module that when executed by the at least one processor associates a category with an Internet site requested by a user, the category being selected from a predetermined list of categories;

a second module that when executed by the at least one processor determines a data transfer rate through a predetermined network access point, the network access point being between an area network and an Internet so that data received from the Internet site in response to the request passes through the network access point, the data transfer rate being indicative of an amount of data traffic passing through the network access point; and a third module that when executed by the at least one processor identifies a predetermined network threshold value associated with the category that is associated with the requested Internet site, compares the predetermined network threshold value with the data transfer rate, and controls access through the network access point to the Internet site requested by the user based at least in part on the comparison.

2. The system of claim 1, wherein the data transfer rate is indicative of a total data transfer rate between the area network and the Internet.

3. The system of claim 1, wherein the data transfer rate is indicative of a portion of a total data transfer rate between the area network and the Internet that is associated with the category.

4. The system of claim 1, wherein the area network is a local area network.

5. The system of claim 1, wherein the area network is a wide area network.

6. The system of claim 5, wherein the wide area network includes a plurality of local area networks.

7. A method comprising:

associating a category with an Internet site requested by a user, the category being selected from a predetermined list of categories;

determining a bandwidth through a predetermined network access point, the network access point being between an area network and an Internet so that data received from the Internet site in response to the request passes through the network access point, the bandwidth being indicative of an amount of data traffic passing through the network access point;

identifying a predetermined network threshold value associated with the category that is associated with the requested Internet site;

comparing the predetermined network threshold value with the bandwidth; and controlling access through the network access point to the internet site requested by the user based at least in part on the comparison.

8. The method of claim 7, wherein the bandwidth is indicative of a total data transfer rate between the area network and the Internet.

9. The method of claim 7, wherein the bandwidth is indicative of a portion of a total bandwidth between the area network and the Internet that is associated with the category.

10. The method of claim 7, wherein the area network is a local area network.

11. The method of claim 7, wherein the area network is a wide area network.

12. A system comprising:

means for associating a category with an Internet site requested by a user, the category being selected from a predetermined list of categories;

means for determining a data transfer rate through a predetermined network access point, the network access point being between an area network and the Internet so that data received from the Internet site in response to the request passes through the network access point, the data transfer rate being indicative of an amount of data traffic passing through the network access point;

means for identifying a predetermined network threshold value associated with the category that is associated with the requested Internet site;

means for comparing the predetermined network threshold value with the data transfer rate; and means for controlling access through the network access point to the internet site requested by the user based at least in pan on the comparison.

13. A system comprising:

a first module that when executed determines a data transfer rate through a predetermined network access point, the network access point being between a user and an Internet so that data received from an Internet site in response to a request passes through the network access point, the data transfer rate being indicative of an amount of data traffic passing through the network access point;

a first database having categories associated with Internet sites;

a second database having a limit associated with the user; and a second module that when executed controls the user's requested access to the Internet based at least in part on the data transfer rate, the category of a requested Internet site, and the limit associated with the user.

14. The system of claim 13, wherein the data transfer rate is a measure of bytes transferred per time period.

15. The system of claim 13, wherein the data transfer rate is a measure of number of hits per time period.

16. A system comprising:

at least one processor;

a first module that when executed by the at least one processor identifies a software data traffic type associated with a software application running on a computer, the software data traffic type being selected from a predetermined list;

a second module that when executed by the at least one processor determines a data transfer rate through a predetermined network access point, the network access point being within an area network so that data received from the Internet site in response to the request passes though the network access point, the data transfer rate being indicative of an amount of data traffic passing through the network access point; and a third module that when executed by the at least one processor identifies a predetermined network threshold value associated with the software data traffic type that is associated with the software application, compares the predetermined network threshold value with the data transfer rate, and controls transmission of data through the network access point and between the computer and the area network based at least in part on the comparison.

17. The system of claim 16, wherein the software data traffic type is instant messaging.

18. The system of claim 16, wherein the software data traffic type is e-mail.

19. The system of claim 16, wherein the software data traffic type is audio files.

20. The system of claim 16, wherein the software data traffic type is video files.

21. The system of claim 16, wherein the software data traffic type is streaming audio.

22. The system of claim 16, wherein the software data traffic type is streaming video.

23. A method comprising:
- capturing a first data packet transmitted between an area network and an Internet;
- determining a software data traffic type to associate with the first data packet;
- determining a data transfer rate through a predetermined network access point, the network access point being between the area network and the Internet so that data packets received from the Internet passes through the network access point, the data transfer rate being indicative of an amount of data traffic passing through the network access point;
- identifying a predetermined network threshold value associated with the software data traffic type;
- comparing the predetermined network threshold value with the data transfer rate; and
- controlling flow of a second data packet through the network access point based at least in part on the comparison, wherein the first data packet and the second data packet are associated with the same software data traffic type.

24. The method of claim 23, wherein the software data traffic type is instant messaging.

25. The method of claim 23, wherein the software data traffic type is e-mail.

26. The method of claim 23, wherein the software data traffic type is audio files.

27. The method of claim 23, wherein the software data traffic type is video files.

28. The method of claim 23, wherein the software data traffic type is streaming audio.

29. The method of claim 23, wherein the software data traffic type is streaming video.

* * * * *